United States Patent [19]

Bryant et al.

[11] Patent Number: 4,699,193
[45] Date of Patent: Oct. 13, 1987

[54] CURB SCUFF PROTECTION FOR TIRE SIDEWALL

[75] Inventors: Lynn A. Bryant; Louis W. Shurman, both of Canton, Ohio

[73] Assignee: The Firestone Tire & Rubber Company, Akron, Ohio

[21] Appl. No.: 766,385

[22] Filed: Aug. 16, 1985

[51] Int. Cl.$^4$ .................. B60C 13/02; B60C 13/04
[52] U.S. Cl. .................. 152/523; 152/524; 156/116
[58] Field of Search ....... 156/116; 152/523, DIG. 12, 152/524

[56] References Cited

U.S. PATENT DOCUMENTS

| | | | |
|---|---|---|---|
| 3,073,371 | 1/1963 | Leeper | 152/330 |
| 3,113,902 | 12/1963 | Dismuke | 156/416 |
| 3,280,427 | 10/1966 | Smith | 18/13 |
| 3,285,314 | 11/1966 | Roberts | 152/523 |
| 3,382,120 | 5/1968 | Rudder | 156/116 |
| 3,449,201 | 6/1969 | Palmquist et al. | 152/523 |
| 3,607,498 | 9/1971 | Kubota | 156/116 |
| 3,638,704 | 2/1972 | Boileau | 152/523 |
| 3,648,748 | 3/1972 | Lovell | 152/523 |
| 3,764,455 | 10/1973 | Lovell et al. | 161/162 |
| 3,830,274 | 8/1974 | Waser, Jr. | 156/116 X |
| 4,019,945 | 4/1977 | Look et al. | 156/116 X |
| 4,038,256 | 7/1977 | Finelli et al. | 260/75 NH |
| 4,072,645 | 2/1978 | Cogley, Jr. | 260/29.7 M |
| 4,170,503 | 10/1979 | Buchanan et al. | 152/523 X |
| 4,182,393 | 1/1980 | Larson et al. | 152/DIG. 12 X |
| 4,219,066 | 8/1980 | Tamura et al. | 152/523 |
| 4,237,173 | 12/1980 | Kuan | 428/65 |
| 4,256,159 | 3/1981 | Williams | 152/523 |
| 4,259,227 | 3/1981 | Ojakaar | 156/116 X |
| 4,279,286 | 7/1981 | Merli et al. | 156/116 X |
| 4,317,479 | 3/1982 | McDonald | 152/523 |
| 4,318,436 | 3/1982 | Shurman | 156/116 X |
| 4,343,342 | 8/1982 | McDonald | 152/523 |

FOREIGN PATENT DOCUMENTS

| | | | |
|---|---|---|---|
| 0485441 | 8/1952 | Canada | 152/523 |
| 55-91408 | 7/1980 | Japan | 152/523 |

Primary Examiner—Donald E. Czaja
Assistant Examiner—Ramon R. Hoch
Attorney, Agent, or Firm—Daniel N. Hall

[57] ABSTRACT

A pneumatic tire having a decorative applique on the sidewall thereof. The applique is protected from damage when the sidewall is curbed by the provision of a rib concentric with the applique and interposed upon the sidewall between the applique and the tire tread. A decoupling groove interconnects the applique and the rib and allows the portion of the sidewall maintaining the applique to decouple from the remainder of the sidewall, deflecting inwardly when the sidewall makes contacting engagement with a vertical surface such as a curb. The deflection of the applique prevents contact with the curb and allows the rib to draw inwardly and over the outer edge of the applique, further protecting it from scuffing action.

16 Claims, 2 Drawing Figures

CURB SCUFF PROTECTION FOR TIRE SIDEWALL

TECHNICAL FIELD

The invention herein resides in the art of pneumatic vehicle tires and, more particularly, to such tires having decorative appliques on the sidewall thereof. Specifically, the invention relates to a sidewall design in a pneumatic tire which allows for protection of a sidewall applique from scuffing when the sidewall of the tire comes into contact with a substantial vertical surface.

BACKGROUND OF THE INVENTION

Decorative sidewalls for vehicle tires have been well received by the consuming public. Typically, these decorative sidewalls include a white or light colored applique circumferentially positioned about the sidewall. A particular type of such tire has become generically known as a "white sidewall" tire. Tires having such decorative appliques are given to damage by curbing, rotation of the sidewall of the tire against a substantial vertical surface such as a road curb. Such contact generally results in a scraping or scuffing of the decorative surface, substantially impairing the decorative appearance thereof. In the case of tires having sidewall bands thereon which consist of an extrudate of white or colored rubber, the scuff will typically not be totally destructive of the decorative applique. This is due to the fact that the decorative extrudate has a somewhat substantial thickness and is protected at the edges by a layer of black rubber resulting from the manufacturing process. While not totally destructive, the appearance of the decorative sidewall may be permanently impaired.

Copending U.S. patent application Ser. No. 766,727, filed Aug. 16, 1985, assigned to the Firestone Tire & Rubber Company, the assignee of the instant application, presents a tire which includes a decorative applique in the form of a thin decal. As taught by that application, the decal is in the form of a thin layer of polymeric paint which is transferred to the tire during the curing process. The polymeric paint layer is extremely thin, on the order of 0.003 inch, such that scuffs imparted to the applique can be extremely damaging, to the point of actually removing the scuffed area of the applique. Further, the edges of the applique as taught by this application are not protected by an overlapping layer of black rubber and, accordingly, the edges themselves may be exposed to the damaging effects of the vertical curb surface. Such contact can have the detrimental effect of actually "peeling" the applique from the tire.

It has previously been known to provide curb ribs on passenger tires to absorb some of the shock from curbing the tire. While such curb ribs have been somewhat successful in protecting the white sidewall area of the tires, damage has still been found to occur in such situations. There are also previously known sidewall protectors in the form of shields that are used to cover the sidewall. Yet further, tires have also been previously designed to contain raised ribs about the sidewall band. However, the purpose of the raised ribs has been to improve the aesthetic appearance of the decorative band, giving better definition or resolution to the same. Typically, these ribs are formed as a part of the extrudate containing the decorative sidewall, with a portion of the extrudate being ground or buffed away after curing to expose the sidewall and retain the inner and outer circumferential ribs.

Previously, however, there has been no presentation of a pneumatic tire in which the decorative area of the sidewall is protected by the combination of a protective rib and a decoupling action of the sidewall, allowing the decorative portion of the sidewall to deflect inwardly of the tire upon contact with a substantial vertical surface. Such a combination seeks to protect the sidewall in two different ways, the latter of which is to actually withdraw from the threatening surface that portion of the tire which is sought to be protected.

DISCLOSURE OF THE INVENTION

In light of the foregoing, it is a first aspect of the invention to provide a pneumatic tire wherein a decorative sidewall applique decouples from the tire, deflecting away from the contacted vertical surface upon contact.

Another aspect of the invention is the provision of a pneumatic tire wherein the outer most edge of a decorative applique is protected from curb contact by means of a protective rib which rolls down and up over the exposed outer edge of the applique upon curb contact.

Yet an additional aspect of the invention is the provision of a pneumatic tire which allows for the use of thin appliques rather than costly extrudates of black and white and/or colored rubber to impart a decorative feature to the sidewall.

The foregoing and other aspects of the invention which will become apparent as the detailed description proceeds are achieved by the improvement in a pneumatic tire having a tread area, a sidewall area connected to the tread area, and a bead connected to the sidewall area at an end thereof and defining an opening for receiving a wheel, the sidewall area having a neutral exterior sidewall axis line defined by a smooth sidewall surface, such improvement comprising: a decorative applique maintained upon the sidewall area; and a protective rib maintained upon the sidewall area between the tread area and said decorative applique and extending outwardly of the tire from the neutral sidewall axis, said protective rib separated from said decorative sidewall applique by a groove.

Other aspects of the invention are achieved by a pneumatic tire, comprising: a tread area; a sidewall area extending from the tread area; a decorative applique connected to said sidewall area; a rib protruding from said sidewall area between said tread area and said decorative applique; and a groove interconnecting said rib and said applique.

DESCRIPTION OF DRAWINGS

For a complete understanding of the objects, techniques, and structure of the invention reference should be had to the following detailed description and accompanying drawings wherein.

BEST MODE FOR CARRYING OUT THE INVENTION

Figure 1:
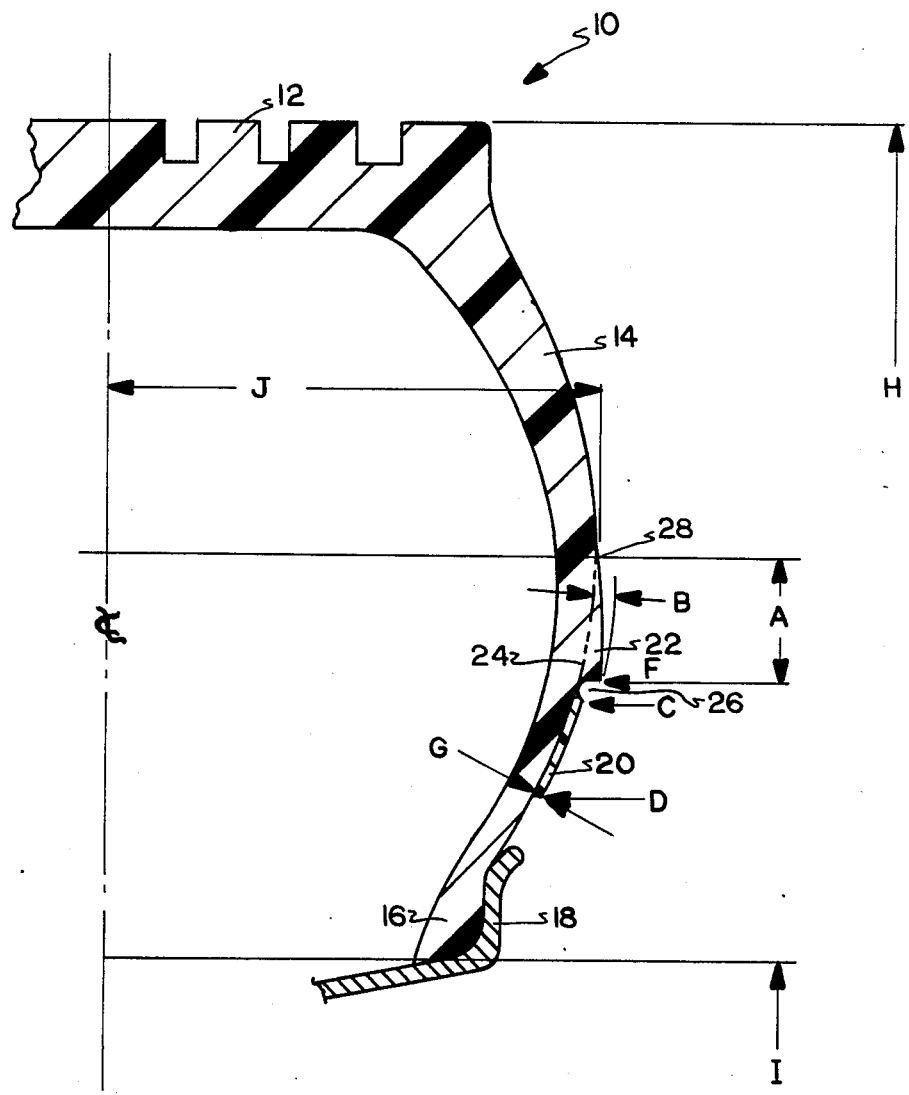
FIG. 1 is a partial sectional view of a tire according to a first embodiment of the invention.

Referring now to the drawings and more particularly FIG. 1, it can be seen that a pneumatic tire according to the invention is designated generally by the numeral 10. The pneumatic tire 10 includes a tread area 12, a sidewall area 14, and a bead area 16 in somewhat standard fashion. The bead area 16 is adapted for mating engagement with the rim of a wheel 18 as shown.

A decorative decal or applique 20 is applied to the sidewall area 14 of the tire as shown in cross section in FIG. 1. It will be understood that the applique 20, in the instance shown, comprises a band which is substantially concentric with the bead 16 of the tire, circumferentially maintained upon the sidewall surface. As mentioned above, the applique 20 may be an extremely thin applique such as an adhered layer of polymeric paint having a thickness on the order of 0.003 inch. It will be understood, however, that the concepts of the invention are equally applicable to decorative appliques 20 which might be imparted by means of the application of a rubber extrudate as known from the prior art.

Protection of the applique 20 is achieved by means of a protective rib 22, provided about the sidewall 14 of the tire 10 concentric with the applique 20. For the purposes of minimizing material use while maintaining physical integrity, the rib 22 is substantially triangular in cross section as shown. It begins at a point 28 flush with the sidewall area 14 of the tire and extends beyond the neutral exterior sidewall axis line 24 to a maximum rib depth shown in the drawing by the letter B. It will be understood that the neutral exterior sidewall axis line 24 is the surface that would be assumed by the sidewall 14 of the tire 10 by a completely smooth (uniform depth) sidewall surface, absent the rib 22 and the applique 20. Of course, it will be appreciated that the rib 22 may be of other geometric cross section consistent with the objects hereof.

A decoupling groove 26 separates the point of maximum depth of the rib 22 and the outer edge of the applique 20. As shown in FIG. 1, the groove 26 interconnects both the rib 22 and the applique 20 and has a maximum depth defined by the bottom thereof which is flush with the neutral exterior sidewall axis line 24. It is, however, contemplated that the groove 26 may extend to a maximum depth short of the neutral exterior sidewall axis line 24.

The rib 22 and decoupling groove 26 act to protect the applique 20 in the following manner. When the sidewall area 14 comes into scuffing contact with a vertical curb surface or the like, the rib 22 is urged radially inward toward the bead 16, covering the outer edge of the applique 20. At the same time, the decoupling groove 26, as its name implies, decouples the sidewall area of the tire at the point of the groove, allowing the sidewall area containing the applique 20 to deflect inwardly of the tire toward the centerline thereof. This deflection further allows the rib 22 to extend over the outer edge of the applique 20. The inward deflection of the sidewall area containing the applique 20 withdraws the applique from the abrasive curb surface, while the rib 22 seals and protects the outer edge thereof. Accordingly, the applique 20 is removed from contacting engagement with the curb surface.

Effectively, the decoupling groove 26 acts like a score line, defining the weakest line in the sidewall area 14, such that any deflection of the sidewall area resulting from forceful contact therewith will be about such score line.

Figure 2:
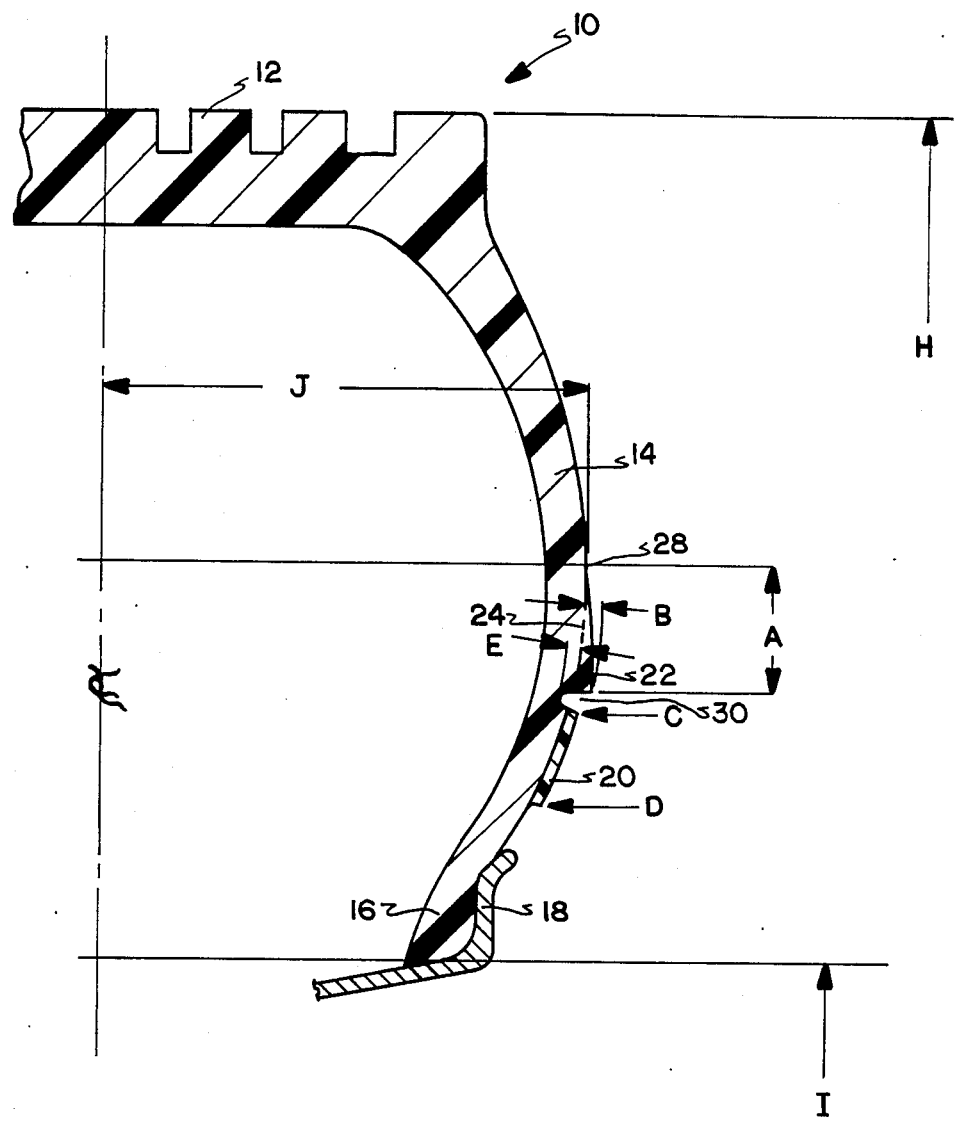
FIG. 2 is a partial sectional view of a tire according to a second embodiment of the invention.

With reference now to FIG. 2, yet another embodiment of the invention may be seen. Here, the tire 10 is substantially similar to that discussed above with respect to FIG. 1, including a tread area 12, sidewall area 14, and bead 16 mating with the rim of a wheel 18.

Again, an applique 20 is provided as is a rib 22. However, in the embodiment of FIG. 2, the decoupling groove 30 extends inwardly into the sidewall area 14 and beyond the neutral exterior sidewall axis line 24. This deeper groove, actually in interference with the sidewall area 14, provides an even more definite score line for tire deflection than that realized with the structure of FIG. 1. In all other respects, the structure of the two embodiments is the same.

Certain parameters with respect to the rib 22 and the decoupling grooves 26,30 have been found to exist. By way of example, it has been found that the maximum extension of the rib 22 beyond the outer surface of the applique 20 must be at least 0.150 inch. Within this limitation, other parameters for the design of the protective rib and decoupling groove are given with respect to the dimension shown in FIGS. 1 and 2 according to the following formula:

$$B = [(C-1.12) \times 0.1] \times 0.71 [Jdefl/Hdefl - F)/2] + G$$

where:

A = minimum protective rib width = 3.5B
B = minimum protective rib depth above the neutral exterior sidewall axis line
C = inflated outside diameter of applique surface
D = inflated inside diameter of applique surface
E = minimum decoupling groove depth of FIG. 2 where the groove passes into the sidewall beyond the neutral exterior side wall axis line = 0.15B
F = outside diameter of widest point of the protective rib height measured through axial line of wheel
G = 0.0065(C-D)(minimum)
H = outside tire diameter
Hdefl = deflected tire outside diameter at rated inflation pressure and load on a standard design rim = H/2 + static loaded radius, where the static loaded radius is the tire axle height at rated load and inflation pressure
I = nominal bead diameter
J = over all tire width
Jdefl = 0.85J The minimum decoupling groove width is equal to (F-C)/2 = 0.0071(I—2.24). The maximum width for the decoupling groove is 0.35 inch. In the foregoing, all dimensions are in inches.

The parameters presented above have been found to effectively allow the applique portion of a sidewall to deflect from the remainder of the sidewall upon rotary scuffing of the sidewall against a vertical surface. They have further been found to allow the rib 22 to extend down over the outer circumferential edge of the applique 20, protecting such edge from peeling action of the curb surface.

A tire according to the foregoing description was tested against an 8 inch high abrasive concrete curb. After fifty complete revolutions with the sidewall of the tire in constant contact with the curb, there was no apparent marring or scuffing of the decorative sidewall applique which was present on the tire in the form of a band.

Thus it can be seen that the objects of the invention have been satisfied by the structure presented hereinabove. While in accordance with the patent statutes only the best mode and preferred embodiments of the invention have been presented and described in detail, it is to be understood that the invention is not limited thereto or thereby. Accordingly, for an appreciation of the true scope and breadth of the invention reference should be had to the following claims.

What is claimed is:

1. In a pneumatic tire having a tread area, sidewall area connected to the thread area, and a bead connected to the sidewall area at an end thereof and defining an opening for receiving a wheel, the sidewall area having a neutral exterior sidewall axis line defined by a smooth sidewall surface, the improvement, comprising:

a decorative applique maintained upon the sidewall area; and a protective rib maintained upon the sidewall area between the thread area and said decorative applique and extending outwardly of the tire from the neutral sidewall axis, said protective rib separated from said decorative sidewall applique by an interconnecting groove, said groove having a first edge common to a first edge of said applique and a second edge common to a first edge of said rib, said groove causing said applique to deflect inwardly of the tire and draw said protective rib down over said first edge of said applique upon the sidewall making scuffing contact with a vertical surface.

2. The improvement in a pneumatic tire according to claim 1, wherein said rib has a substantially triangular cross section.

3. The improvement in a pneumatic tire according to claim 2 wherein said rib, at a second edge thereof, is substantially flush with the neutral exterior sidewall axis line.

4. The improvement in a pneumatic tire according to claim 1 wherein said rib extends beyond an outer surface of said decorative applique a distance of at least 0.150 inch.

5. The improvement in a pneumatic tire according to claim 3 wherein said rib has a width at least equal to 3.5 times a depth thereof.

6. The improvement in a pneumatic tire according to claim 1 wherein said groove is concentric with the tire bead.

7. The improvement in a pneumatic tire according to claim 6 wherein said groove is continuous, forming a ring about the sidewall of the tire between said applique and said rib.

8. The improvement in a pneumatic tire according to claim 1 wherein a bottom of said groove is above the neutral exterior sidewall axis line.

9. The improvement in a pneumatic tire according to claim 1 wherein said groove extends inwardly of the sidewall area through the neutral exterior sidewall axis line.

10. A pneumatic tire, comprising:

a tread area;

a sidewall area extending from the thread area;

a decorative applique connected to said sidewall area;

a rib protruding from said sidewall area between said thread area and said decorative applique; and a groove interconnecting said rib and said applique, said groove extending from a second inner edge of said rib to an outer edge of said applique, said groove causing said applique to deflect inwardly of the tire and draw said protective rib down over said outer edge of said applique upon the sidewall area of the tire making scuffing contact with a vertical surface.

11. The pneumatic tire according to claim 10 wherein said rib is of substantially triangular cross section.

12. The pneumatic tire according to claim 11 wherein a first outer edge of said rib is substantially flush with said sidewall area.

13. The pneumatic tire according to claim 10 wherein said rib has a minimum width between said inner and outer edges equivalent to 3.5 times the depth of protrusion of said rib from said sidewall area.

14. The pneumatic tire according to claim 10 wherein said groove has a bottom which is substantially flush with said sidewall area.

15. The pneumatic tire according to claim 10 wherein said groove has a bottom which extends inwardly of said tire to a point beyond said sidewall area.

16. The pneumatic tire according to claim 10 wherein said rib extends beyond an outer surface of said decorative applique a distance in excess of 0.15 inch.

* * * * *

UNITED STATES PATENT OFFICE
CERTIFICATE OF CORRECTION

Patent No. 4,699,193     Dated October 13, 1987

Inventor(s) Louis W. Shurman and Lynn A. Bryant

It is certified that error appears in the above-identified patent and that said Letters Patent are hereby corrected as shown below:

On The Title Page, Item [75] "Lynn A. Bryant and Louis W. Shurman" to --Louis W. Shurman and Lynn A. Bryant--.

ITEM [19] "Bryant et al." should read -- Shurman et al. --.

Signed and Sealed this

Twenty-ninth Day of March, 1988

Attest:

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO.   : 4,699,193
DATED        : October 13, 1987
INVENTOR(S)  : Louis W. Shurman and Lynn A. Bryant It is certified that error appears in the above-identified patent and that said Letters Patent are hereby corrected as shown below:

Column 5, line 5 - "thread" should be "tread"

Signed and Sealed this

Twenty-fifth Day of October, 1988

Attest:

DONALD J. QUIGG

Attesting Officer

Commissioner of Patents and Trademarks